United States Patent [19]
Wehner

[11] 3,797,835
[45] Mar. 19, 1974

[54] HIGH PRESSURE JOINT AND SEALING RING THEREFOR

[75] Inventor: Byrom T. Wehner, Houston, Tex.

[73] Assignee: Armco Steel Corporation, Middletown, Ohio

[22] Filed: Apr. 21, 1972

[21] Appl. No.: 246,187

[52] U.S. Cl............................. 277/171, 285/334.4
[51] Int. Cl............................................. F16j 15/08
[58] Field of Search................... 277/170, 171, 172; 220/46 MS; 285/332.3, 334.4

[56] References Cited
UNITED STATES PATENTS
3,104,121  9/1963  Nordin et al..................... 277/171
3,166,345  1/1965  Pinkard........................... 285/332.3

Primary Examiner—Louis R. Prince
Assistant Examiner—Robert I. Smith
Attorney, Agent, or Firm—John W. Melville; Albert E. Strasser; Stanley H. Foster

[57] ABSTRACT

A high pressure joint between fluid carrying conduits and sealing ring therefor. The conduits are of circular cross section and of the type wherein the end of a first one of the conduits is received within the end of a second one of the conduits to form the joint. The sealing ring is located between the exterior surface of the end of the first conduit and the interior surface of the end of the second conduit. The sealing ring and the last mentioned exterior and interior surfaces are so configured that a fluid tight seal is achieved at the joint whether pressure be applied from the interior or the exterior of the joint.

6 Claims, 9 Drawing Figures

HIGH PRESSURE JOINT AND SEALING RING THEREFOR

BACKGROUND OF THE INVENTION

1. Field of the Invention

The invention relates to a conduit joint and sealing ring therefor, and more particularly to such a joint and sealing ring capable of withstanding high pressures applied both from the exterior and the interior of the joint.

2. Description of the Prior Art

A search was conducted in the United States Patent Office in an effort to develop the most pertinent prior patent art, but no assertion is made that in fact the best art was located, although that indeed was the intention behind the search. Such search did develop the following U.S. Pat. Nos.: 1,674,130 Russell et al.; 1,920,512 Lamont; 2,552,750 Thornhill; 2,582,995 Laurent; 2,687,229 Laurent; 2,884,264 Takeuchi; 3,001,803 Watts et al.; 3,054,173 Laurent; 3,062,565 Word; 3,325,190 Eckert et al.; 3,424,480 Holland; and 3,479,063 Raver.

The use of the structure of the present invention is substantially unlimited, being applicable whenever a high pressure conduit joint is required. This is particularly true in instances wherein the conduit joint may be subjected to high pressure both internally and externally.

For purposes of an exemplary showing the structure of the present invention will be described with respect to its application in association with well head equipment. Typically, a well is provided with one or more casing heads. The casing head is surmounted by a tubing head or spool containing a single or multiple string tubing. The tubing hanger will support a mandrel for each tubing string used, the well tubing of each string being affixed to its respective mandrel. The tubing head, in turn, is surmounted by additional well head components such as one or more master valves or the like. These last mentioned components have one or more interior bores adapted to communicate with the bore or bores in the one or more tubing hanger mandrels and hence the tubing supported thereby.

Each mandrel bore in the tubing hanger communicates with its respective bore in the surmounting master valve or other well head component through the use of an intermediate connecting element, hereinafter referred to as a carrier. The lower end of each carrier is received within the bore in its respective mandrel and forms a fluid tight seal therewith. The upper end of each carrier is received within its respective bore in the master valve and makes a fluid tight seal therewith.

In instances where more than one master valve is used, the corresponding bores in the valve are also joined by intermediate connecting elements or carriers. A carrier used to join bores of like diameter is usually referred to simply as a "carrier" or a "regular carrier." A carrier used to join bores of different diameters is generally referred to as a "transition carrier."

The fluid tight seals between the above mentioned carriers and their respective bores are accomplished through the use of sealing rings of the type taught in U.S. Letters Pat. No. 2,687,229. These sealing rings are characterized by the fact that they form a pressure joint, i.e., the greater the pressure within the joined conduits or bores, the more tightly the rings seal with the adjacent joint surfaces.

The prior art well head structure thus far described provides a number of advantages. For example, the combination of the regular or transition carrier and its respective sealing rings results, when the sealing rings are properly located, in a fluid tight joint between the bores being joined. In addition, the combination provides a joint which is substantially self-aligning. This is an important feature since the well head components are extremely heavy and difficult to maneuver and manipulate during assembly.

However, it has been discovered that a pulse of pressure from the exterior of the joint and against the sealing rings can dislodge them from their proper position, thereby destroying the fluid tight seal. For example, in certain tests to which the well head equipment is subjected (and which will be described hereinafter), it is common practice to apply a high pressure to the sealing rings exteriorly of the joints they seal. During such a test, the sealing rings may become dislodged from their proper position. To avoid this problem, it was prior art practice to maintain a high pressure interiorly of the joint during such tests.

The present invention is directed to joints such as those formed between carriers and their respective bores and the provision of sealing rings for such joints, wherein the sealing rings and adjacent joint surfaces are so configured that the integrity of the fluid tight joint formed thereby is maintained under pressure either from within the jont or exteriorly thereof. At the same time, the joints maintain their self-aligning characteristic.

SUMMARY OF THE INVENTION

The invention relates to a high pressure, fluid-tight joint between first and second fluid-carrying conduits of circular cross section and a sealing ring therefore. The conduits are adapted to be in axial alignment with an end portion of the first conduit being recieved within an end portion of the second conduit so as to present juxtaposed, annular sealing surfaces. A first one of the sealing surfaces is frusto-conical and opens toward the last mentioned end of the second conduit. The second of the sealing surfaces has two adjacent portions. A first portion of the second sealing surface is also frusto-conical, opening toward the same end of the second conduit and being angularly related to the first frusto-conical sealing surface. The second portion of the second sealing surface is angularly related to both the first sealing surface and the first portion of the second sealing surface.

A sealing ring is located between the juxtaposed first and second sealing surfaces. The sealing ring has a first end facing toward the end last mentioned of the second conduit and a second end facing in the opposite direction. The sealing ring has outer and inner surfaces configured to conform to the juxtaposed annular sealing surfaces of the first and second conduits respectively.

As will be described hereinafter, the juxtaposed sealing surfaces of the first and second conduits and the sealing ring are so configured that a pressure tightened joint will be formed thereby when a high pressure is applied to the second end of the sealing ring from within the conduits and when a high pressure is applied to the first end of the sealing ring from outside the conduits.

In the particular embodiments to be described, two high pressure joints of the present invention are formed. One is formed between a carrier and a first conduit or bore. The other is formed between the same carrier and a second conduit or bore. In these instances, the bores are equivalent to the above mentioned second conduit, while the carrier is equivalent to the above mentioned first conduit.

BRIEF DESCRIPTION OF THE DRAWINGS

FIG. 2 is a fragmentary cross sectional view taken through a portion of a well head assembly illustrating joints of the present invention formed between a pair of transition carriers and adjacent bores in a master valve and in a pair of mandrels.

DESCRIPTION OF THE PREFERRED EMBODIMENTS

Figure 1:
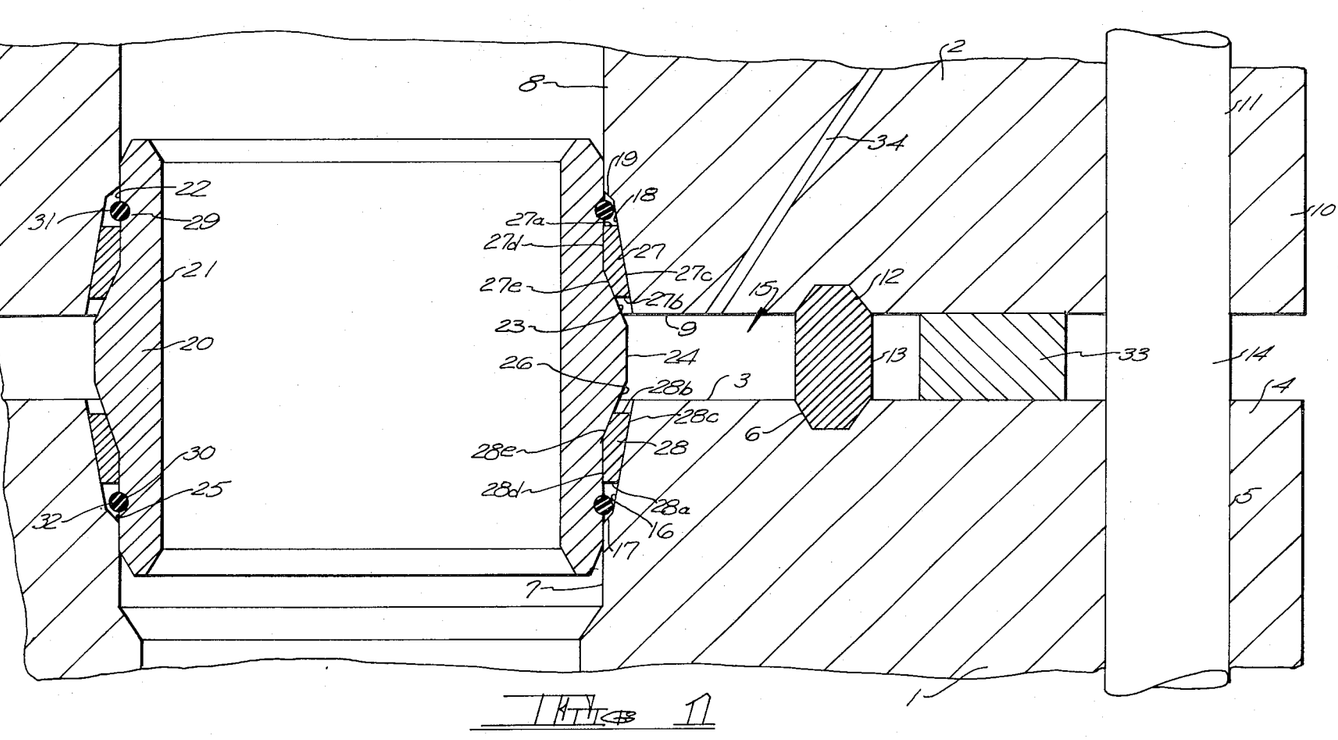
FIG. 1 is a fragmentary cross sectional view through a portion of a well head assembly illustrating joints of the present invention formed between a carrier and bores in adjacent master valves or like components.

In FIG. 1 a pair of master valve bodies are fragmentarily shown at 1 and 2. FIG. 1 illustrates the lower end of master valve body 2 supported upon the upper end of master valve body 1. The precise nature of the master valve bodies 1 and 2 does not constitute a limitation on the present invention.

The master valve body 1 has an upper surface 3 and a peripheral flange, a portion of which is shown at 4. The peripheral flange 4 extends about the upper end of master valve body 1 and has a plurality of perforations therethrough. The perforations are evenly spaced about the flange and one such perforation is shown at 5. The flange also has an annular groove 6 therein which is continuous about the upper surface 1 of the master valve body 1 and encompasses the bore 7 and any other bores the master valve body 1 may have therethrough.

The master valve body 2, surmounting the valve body 1, has a bore 8 of the same diameter as the bore 7 and coaxial therewith. It will be understood that the master valve body 2 will have additional bores (not shown) communicating with any additional bore the master valve body 1 may have. The master valve body 2 has a lowermost surface 9 and peripheral flange (similar to the peripheral flange 4 of valve body 1), a portion of which is shown at 10. The flange 10 has a plurality of perforations 11 evenly spaced thereabout and coaxial with the matching perforations 5 in the flange of the valve body 1. The flange 10 also has an annular groove 12 corresponding to the groove 6 in the valve body 1. The groove 12 extends continuously about the lower surface of the master valve body 2, encompassing the bore 8 and any like bores therein.

An annular gasket 13 is located in the grooves 6 and 12. The flanges 4 and 10 are clamped together by means of bolts passing through the perforations 5 and 11. One such bolt is illustrated at 14. Thus it will be understood that the space generally indicated at 15 (encompassed by the gasket 13 and located between the upper surface 3 of master valve body 1 and the lower surface 9 of master valve body 2) is provided with a fluid tight seal by the gasket 13.

The bore 7 of master valve body 1 is generally cylindrical in configuration. However, the upper portion of bore 7 terminates in a frusto-conical surface 16, a shoulder 17 being formed between the cylindrical bore 7 and the frusto-conical portion 16. The bore 8 of master valve body 2 is also cylindrical, and, as indicated above, is of the same diameter as the bore 7. The bore 8 terminates at its lower end in a frusto-conical surface 18, separated from the cylindrical portion by the shoulder 19. The frusto-conical surfaces 16 and 18 are substantially identical except that they open toward each other.

The bores 7 and 8 are joined together by a connecting means or carrier 20. The carrier 20 has a cylindrical bore 21 communicating with the bores 7 and 8.

At its upper end, the exterior surface of the carrier is cylindrical, as at 22. The portion 22 has an outside diameter such that it will be received within the cylindrical bore 8 of the master valve body 2 with a sliding fit. Adjacent the cylindrical surface 22, the exterior of the carrier is provided with a frusto-conical surface 23. It will be noted that the surface 23 is angularly related to the frusto-conical surface 18 of the master valve body 2, flaring downwardly and outwardly at a greater angle. The carrier 20 has a centrally located exterior surface 24 which is cylindrical and of greater diameter than the cylindrical bores 7 and 8.

The lower portion of the carrier 20 is similarly configured, having a cylindrical exterior surface 25 equivalent to the exterior surface portion 22 and receivable in the cylindrical bore 7 with a sliding fit. Between the exterior surfaces 24 and 25 there is a frusto-conical surface 26 equivalent to the frusto-conical surface 23. Again it will be noted that the frusto-conical surface 26 of the carrier is angularly related to the frusto-conical surface 16 of the bore 7, flaring upwardly and outwardly at a greater angle.

A sealing ring 27 is located between the surface 18 of the bore 8 and both the surface 22 and the surface 23 of the carrier. The sealing ring 27 has an upper end 27a and a lower end 27b. The exterior surface 27c of the sealing ring is frusto-conical and conforms to the frusto-conical portion 18 of the bore 8. The inner surface of the sealing ring 27 has two portions, a first cylindrical portion 27d conforming to the cylindrical surface 22 of the carrier and a second frusto-conical portion 27e conforming to the frusto-conical carrier surface 23. Again it will be noted that the frusto-conical sealing ring surfaces 27c and 27e are angularly related to each other, the surface 27e flaring downwardly and outwardly at a greater angle than the surface 27c.

Between the frusto-conical surface 16 of the master valve body 1 and the surfaces 25 and 26 of the carrier 20, there is located a sealing ring 28. The sealing ring 28 has a lower end 28a, an upper end 28b and an exterior frusto-conical surface 28c, corresponding to the frusto-conical surface 16, and an inner surface having portions 28d and 28e corresponding to the carrier surfaces 25 and 26, respectively.

The assembly of the structure thus far described may be accomplished as follows. The sealing rings 27 and 28 may be applied to the carrier 20. The carrier may have annular grooves 29 and 30 formed therein, to receive retaining rings 31 and 32, respectively. The purpose of retaining rings 31 and 32 is simply to hold the sealing rings 27 and 28 in place on the carrier during handling and installation.

With the sealing rings in position, the carrier is inserted in the bore 7 of master valve body 1. Thereafter, the annular gasket 13 may be located in the annular notch 6 in the master valve body 1. This may be followed by the placement of an annular spacing ring 33 on the upper surface 3 of the master valve body 1. The purpose of the spacing ring 33 will be described hereinafter.

At this point, the master valve body 2 may be lowered upon the master valve body 1. It will be evident that the frusto-conical exterior surface 27c of the sealing ring 27 and the corresponding frusto-conical surface 18 of the master valve body bore 8 will cooperate to guide the master valve body 2 into position. The annular gasket 13 will be received within the groove 12 in the master valve body 2 and the assembly is thereafter clamped together by the bolts 14. The annular spacing ring 33 will limit the amount by which the valve body 2 can approach the valve body 1 so as to protect the sealing rings 27 and 28 and the annular gasket 13.

In the particular exemplary embodiment described, it is not unusual for the bores 7, 8 and 21 to have high pressures therein, in the neighborhood from about 5,000 psi to about 15,000 psi. It will be noted from FIG. 1 that a high pressure within the bores 7, 8 and 21 will be exerted on the upper end 27a of sealing ring 27 and the lower end 28a of sealing ring 28. When this occurs, the joint will be pressure tightened by virtue of the wedging action between the sealing rings 27 and 28 and the adjacent joint surfaces. Thus, with respect to sealing ring 27, this wedging action is accomplished through the interaction of the sealing ring surfaces 27c and 27e and the corresponding master valve bore surface 18 and the carrier surface 23. Similarly, with respect to sealing ring 28, the wedging action is achieved through the interaction of sealing ring surfaces 28c and 28e and the corresponding valve body surface 16 and carrier surface 26.

The purpose of annular gasket 13 is to assure that leakage will not occur should one of the carrier seals formed by sealing ring 27 or 28 fail. This has become extremely important in view of recent ecological considerations. It will be understood that the annular gasket 13 must form a seal between master valve bodies 1 and 2 capable of withstanding the maximum pressure that might be present within the bores 7, 8 and 21.

To assure that this is the case, it is common to provide a bore 34 which is normally sealed, but which may be used for test purposes to subject the area 15 to high pressure in order to check the efficacy of the seals formed by gasket 13. At the present time, it is common practice to subject the area 15 and the annular gasket 13 to pressures in the neighborhood of 5,000 psi. Previously, it was necessary to maintain a pressure in excess of 4,000 psi within the bores 7, 8 and 21 to prevent the carrier seals from becoming dislodged during the test.

With the joint and sealing rings of the present invention, it is no longer necessary to maintain a back pressure during the testing of gasket 13. When a high pressure is provided in the space 15, it will again be evident from FIG. 1 that the joint will again be pressure tightened. This is true by virtue of the wedging action of sealing rings 27 and 28 and the adjacent joint surfaces. Thus, with respect to sealing ring 27, the wedging action is produced by its surfaces 27c and 27d, the surface portion 18 of the master valve body 2 and the surface portion 22 of the carrier. A similar wedging action will be accomplished with respect to the sealing ring 28 through the interaction of sealing ring surfaces 28c and 28d, the surface portion 16 of the master valve body 1 and the surface 25 of the carrier.

Thus, with respect to each joint (i.e., the joint between the carrier and the master valve body 1 and the joint between the carrier and the master valve body 2) a fluid-tight seal is accomplished through the use of a single sealing ring, which joint is pressure tightened when pressure is exerted from within the joint and when pressure is exerted externally of the joint.

FIG. 2 illustrates the assembly of a master valve body, generally indicated at 34 and a tubing head or spool, generally indicated at 35.

FIG. 2 illustrates the lower end of the master valve body 34, which is similar to those described with respect to FIG. 1. In this instance, the valve body is shown as having a pair of bores 36 and 37, a bottom surface 38, and an annular bottom flange 39. The bottom surface 38 has an annular groove 40 therein, equivalent to the annular groove 12 of FIG. 1.

FIG. 2 illustrates the upper end of the tubing head 35. The tubing has a central bore 41 in which a dual string tubing hanger (not shown) is supported. The tubing hanger, in turn, supports a pair of tubing mandrels 42 and 43. The tubing mandrel 42 has a central bore 44 in which is supported a tubing string 45. Similarly, the tubing mandrel 43 has a central bore 46 in which is supported a tubing string 47. In the embodiment of FIG. 2, a transition carrier 48 is used to join the bore 36 of the master valve body 34 and the bore 44 of the mandrel 42. Similarly, a transition carrier 49 is used to join the bore 37 of the master valve body and the bore 46 of mandrel 43. Transition carriers are used since this is an instance of joining bores of different diameters.

The tubing head 35 has an upper surface 50 with an annular notch 51 therein. The upper end of the tubing head has a flange portion 52 with an upstanding annular rim 53.

When the master valve body 34 is assemblied onto the tubing head 35, an annular gasket 54 is located in the grooves 40 and 51. The annular gasket serves the same purpose as described with respect to gasket 13 of FIG. 1.

The bottom surface 38 of the master valve body 34 comes to rest on the upper surface of the annular upstanding rim 53 of the tubing head. Thus, the rim 53 serves the same purpose described with respect to the annular ring 33 of FIG. 1. The adjacent flanges 39 and 52 of the master valve body and tubing head, respectively, are held together by clamping means 55. Finally, the master valve body 34 may be provided with a passage 56, which is normally sealed, but by which the space (generally indicated at 57) may be pressurized to test the integrity of the annular gasket 54. Thus, the passage 56 is equivalent to and serves the same purpose as the passage 34 described with respect to FIG. 1.

The master valve body bore 36 is generally cylindrical, but the lower end portion terminates in a frusto-conical portion 58, a shoulder 59 being formed between the cylindrical bore and its frusto-conical portion 58. It will be noted that the uppermost end of the bore 44 of mandrel 42 is likewise frusto-conical, as at 60.

The transition carrier 48 has a cylindrical bore 61 therein communicating with the bores 36 and 44. At its uppermost end, the exterior surface of the transition carrier is cylindrical, as at 62. The cylindrical surface 62 is followed by a frusto-conical surface 63, which in turn is followed by a cylindrical surface 64.

Below the cylindrical surface 64 the transition carrier has a frusto-conical surface 65, followed by a cylindrical surface 66. Between the cylindrical surface 64 and the frusto-conical surface 65 there is formed a shoulder 67. It will be noted that the frusto-conical surface 63 of the transition carrier is angularly related to the frusto-conical portion 58 of the master valve body bore 36, flaring downwardly and outwardly at a greater angle. Similarly, the frusto-conical surface 65 of the transition carrier is angularly related to the frusto-conical surface 60 of the bore 44 in mandrel 42, flaring upwardly and outwardly at a greater angle.

A sealing ring 68 is located between the surfaces 62 and 63 of the transition carrier and the surface 58 of the master valve body bore 36. The sealing ring 68 has an upper end 68a, a lower end 68b, a frusto-conical exterior surface 68c conforming to the surface 58 of the master valve body bore 36, a cylindrical inner surface portion 68d conforming to the cylindrical surface 62 of the transition carrier and a second frusto-conical surface 68e, conforming to the frusto-conical surface 63 of the transition carrier. Again it will be noted that the frusto-conical surfaces 68c and 68e of the sealing ring 68 are angularly related to each other, the surface 68e flaring downwardly and outwardly at a greater angle.

Between the frusto-conical surface 60 of the mandrel 42 and the transition carrier there is located a sealing ring 69. The sealing ring 69 has a lower surface 69a, an upper surface 69b, an exterior frusto-conical surface 69c conforming to the mandrel surface 60, a cylindrical surface 69d conforming to the surface 66 of the transition carrier and a second frusto-conical surface 69e conforming the frusto-conical surface 65 of the transition carrier. It will be noted that the frusto-conical surfaces 69c and 69e of the sealing ring 69 are angularly related to each other, the surface 69e flaring upwardly and outwardly at a greater angle.

The cylindrical surface 62 of the transition carrier may have an annular groove 70 therein to receive a resilient retaining ring 71. Similarly, the cylindrical portion 66 of the transition carrier may have an annular groove 72 therein for receipt of a resilient retaining ring 73. The purpose of the retaining rings 71 and 73 is the same as that described with respect to the retaining rings 31 and 32 of FIG. 1. In other words, these retaining rings maintain the sealing rings 68 and 69 in position on the transition carrier 48 during handling and installation thereof.

It will be understood that the transition carrier 49 may be identical to the transition carrier 48 and may be provided with sealing rings 74 and 75, identical to the sealing ring 68 and 69. The transition carrier 49 may further be provided with retaining rings 76 and 77 identical to the retaining rings 71 and 73 of transition carrier 48.

The assembly of the structure of FIG. 2 may be described as follows. The sealing and retaining rings are placed about their respective carriers and carriers 48 and 49 are placed in the bores 44 and 46 of mandrels 42 and 43. The annular gasket 54 is placed in the annular groove 51 in the upper surface 50 of the tubing head 35. The master valve body 34 is then lowered upon the tubing head 35 with its lowermost surface 38 coming to rest on the upstanding rim 53 of the tubing head. The gasket 54 is received within the annular groove 40 in the lower surface 38 of the master valve body. The rim 53 assures that the gasket 54 is properly compressed. Finally, the clamping means 55 is placed about the flanges 39 and 52 of the master valve body and tubing head, respectively, thus completing the assembly.

It will be noted that while the sealing rings 68 and 69 are of the same general type, they differ in diameter because the transition carrier is connecting bores of different diameter.

Unlike the regular carrier shown in FIG. 1 which is symmetrical and carries identical sealing rings 27 and 28, the transition carrier 48 is asymmetrical and the sealing ring 68 is larger than the sealing ring 69. Thus the sealing ring 68 is more resistant to compression or crushing than is the sealing ring 69. For this reason, the sealing ring 69 is so proportioned as to effect a seal between the transition carrier 48 and mandrel 42 before the shoulder 67 of the transition carrier seats upon the upper end of the mandrel 42. When the shoulder 67 of the transition carrier does seat upon the upper end of the mandrel 42, the smaller sealing ring 69 is prevented from being squeezed out of the annular region between the mandrel surface 60 and the adjacent exterior surfaces of the transition carrier. The shoulder 67 also assures that sufficient pressure may be applied to the sealing ring 68 for it to form a good seal and be adequately compressed without damage to the smaller sealing ring 69. It will be understood that the transition carrier 49 and its respective sealing rings 74 and 75 operate in an identical manner.

When a high pressure exists in bores 36, 44 and 61, pressure will be applied to the upper end 68a of sealing ring 68 and the lower end 69a of sealing ring 69. Both sealing rings will form a pressure tightened joint by virtue of the wedging action of the sealing rings and the adjacent joint surfaces. Thus, with respect to sealing ring 68, the wedging action is produced by its surfaces 68c and 68e and the adjacent joint surfaces 58 and 63. Similarly, the wedging action with respect to sealing ring 69 is accomplished by the sealing ring surfaces 69c and 69e and the adjacent joint surfaces 60 and 65.

During testing of the annular gasket 54, or in any other instance wherein the sealing rings are subjected to high pressure from the exterior of the joint, they will again form a pressure tightened seal. Thus, if high pressure is applied to the lower surface 68b of sealing ring 68, the sealing ring surfaces 68c and 68d will have a wedging action with the adjacent joint surfaces 58 and 62. Similarly, if the upper end 69b of sealing ring 69 is subjected to high pressure, the sealing ring will have a wedging action by virtue of the cooperation of its surfaces 69c and 69d with the adjacent joint surfaces 60 and 66. It will be understood that the sealing rings 74 and 75 on transition carrier 49 will function in an identical manner.

Figure 3:
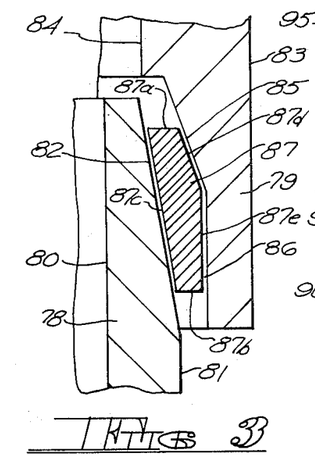
FIGS. 3 through 9 are semi-diagrammatic cross sectional views illustrating other embodiments of the joint and sealing ring of the present invention.
Figure 4:
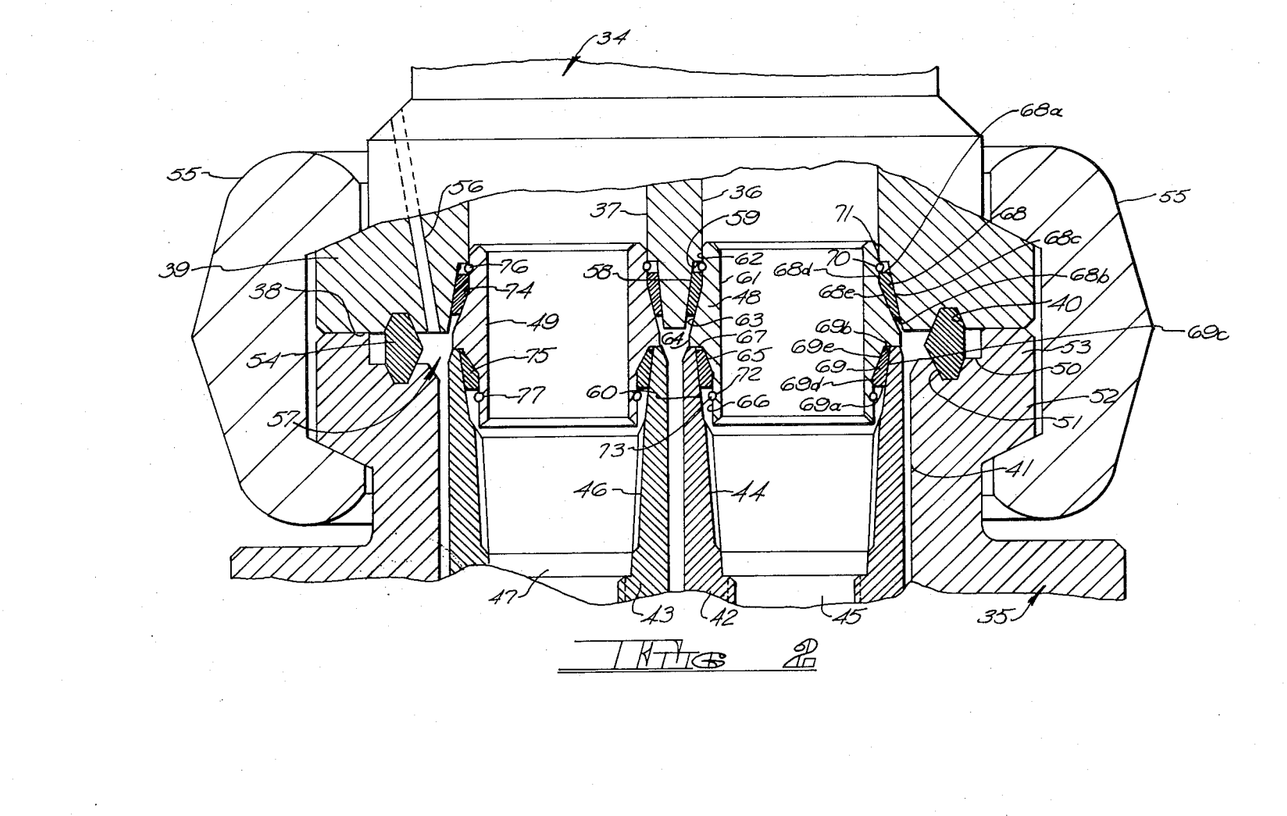
Figure 5:
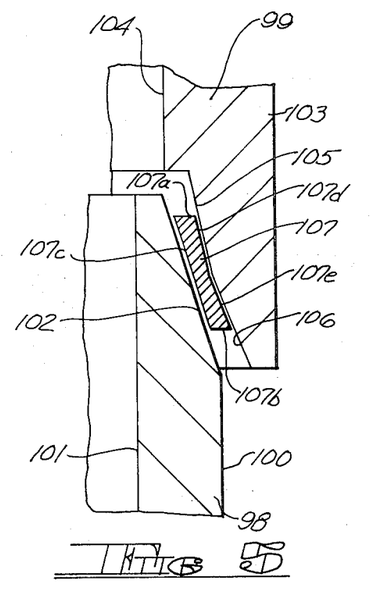

FIGS. 3, 4 and 5 illustrate modifications of the joint and sealing ring elements of the present invention. Turning first to FIG. 3 the upper end of a first conduit 78 is fragmentarily indicated as being received within the lower end of a second conduit 79. The conduit 78 has a cylindrical bore 80, a cylindrical exterior surface 81 and an exterior frusto-conical surface 82 adjacent its upper end. The conduit 79 is shown as having a cylindrical exterior surface 83 and a cylindrical bore 84. The cylindrical bore 84 terminates in a frusto-conical surface 85, followed by a cylindrical surface 86.

It will be noted that the frusto-conical surface 82 on the exterior of conduit 78 is angularly related to both the frusto-conical surface portion 85 and the cylindrical portion 86 of the bore of conduit 79. In the annular space between the conduit ends, a sealing ring 87 is positioned. The sealing ring 87 has a top surface 87a, a bottom surface 87b, a frusto-conical surface 87c conforming to the frusto-conical surface 82 of conduit 78, a frusto-conical surface 87d conforming to the frusto-conical surface 85 of conduit 83 and a cylindrical surface 87e conforming to the cylindrical surface 86 of conduit 79. It will be noted that the frusto-conical surface 87c of the sealing ring 87 is angularly related to both of the sealing ring surfaces 87d and 87e.

From FIG. 3, it will be evident that the sealing ring 87 will form a pressure tightened seal between the ends of the conduit 78 and 79 when the joint is subjected to either internal or external pressures. Thus, if a high pressure is maintained within bores 80 and 84, this pressure will be applied to the top 87a of the sealing ring 87 and the sealing ring 87 will have a wedging action by virtue of the cooperation of its surfaces 87c and 87e and the adjacent joint surfaces 82 and 86, respectively. Similarly, if the joint is subjected to a high pressure from outside, this pressure will be applied to the bottom 87b of the sealing ring and a wedging action will occur between the sealing ring surfaces 87c and 87d and the adjacent joint surfaces 82 and 85, respectively.

FIG. 4 illustrates another embodiment of the joint and sealing ring of the present invention. In FIG. 4 the upper end of a conduit 88 is fragmentarily shown as being received within the lower end of a conduit 89. The conduit 88 has a cylindrical bore 90, an exterior cylindrical surface 91 surmounted by a first frusto-conical surface 92 and a second frusto-conical surface 93. It will be noted that the frusto-conical surfaces 92 and 93 are angularly related to each other, the frusto-conical surface 93 extending upwardly and inwardly at a greater angle.

The conduit 89 is illustrated as having a cylindrical exterior surface 94, a cylindrical bore 95 and a frusto-conical surface 96 at its lowermost end. It will be noted that the frusto-conical surface 96 is angularly related to both frusto-conical surfaces 92 and 93 of conduit 88.

A gasket 97 is located in the annular space between the ends of conduits 88 and 89. The gasket 97 has a top surface 97a, a bottom surface 97b, a frusto-conical exterior surface 97c conforming to the frusto-conical surface 96 of conduit 89 and a pair of frusto-conical interior surfaces 97d and 97e conforming, respectively, to frusto-conical surfaces 92 and 93 of conduit 88.

Again, in FIG. 4 a joint is formed which will be pressure tightened when subjected either to internal or external pressure. Thus, if high pressure is carried within bores 90 and 95, it will be transmitted to the upper end 97a of gasket 97 and gasket surfaces 97c and 97e will have a wedging action with the adjacent joint surfaces 96 and 93, respectively. Similarly, if a high external pressure is present, it will be transmitted to the bottom end 97b of gasket 97 and gasket surface 97c and 97d will have a wedging action with the adjacent joint surfaces 96 and 92, respectively.

Yet another joint and sealing ring assembly of the present invention is illustrated in FIG. 5. Once again the upper end of a conduit 98 is fragmentarily illustrated as being received within the lower end of a conduit 99. The conduit 98 is shown as having a cylindrical surface 100, a cylindrical bore 101 and a frusto-conical exterior surface 102 adjacent its upper end. The conduit 99 is illustrated as having a cylindrical exterior surface 103, a cylindrical bore 104 and a pair of frusto-conical surfaces 105 and 106. It will be noted that the frusto-conical surfaces 105 and 106 are angularly related to each other and to the frusto-conical surface 102 of conduit 98.

In the annular space between the ends of conduits 98 and 99 there is located a gasket 107 having a top surface 107a, a bottom surface 107b, a frusto-conical interior surface 107c conforming to the frusto-conical surface 102 of conduit 98 and a pair of frusto-conical surfaces 107d and 107e conforming to the frusto-conical surfaces 105 and 106 of conduit 99. It will again be noted that the frusto-conical sealing ring surface 107c is angularly related to the exterior sealing ring frusto-conical surfaces 107d and 107e.

In FIG. 5, as in FIGS. 1 through 4, the joint is again pressure tightened both when subjected to internal pressure and when subjected to external pressure. Thus, if bores 101 and 104 carry a high pressure, it will be transmitted to the top 107a of sealing ring 107 and the sealing ring surfaces 107d and 107c will have a wedging action with the adjacent joint surfaces 105 and 102, respectively. If the joint is subjected to external pressure, it will be applied to the bottom 107b of the sealing ring 107 and sealing ring surfaces 107e and 107c will provide a wedging action with the adjacent joint surfaces 106 and 102, respectively.

In all of FIGS. 1 through 5, the sealing ring surfaces are illustrated as being spaced from the adjacent joint surfaces. This is for purposes of clarity only, it being understood that these surfaces will lie against each other forming a tight seal.

In all of the embodiments above described, the sealing rings may be made of any suitable material. The only requirement with respect to the material for the sealing rings is that it be softer than the adjacent joint surfaces. Thus, in well head assembly applications, the sealing rings may be made of steel, stainless steel or the like. On the other hand, if the conduits (as for example those shown in FIGS. 3 through 5) were made of plastic or the like, the sealing rings could also be made of plastic material softer than the adjacent joint surfaces.

Modifications may be made in the invention without departing from the spirit of it.

Figure 6:
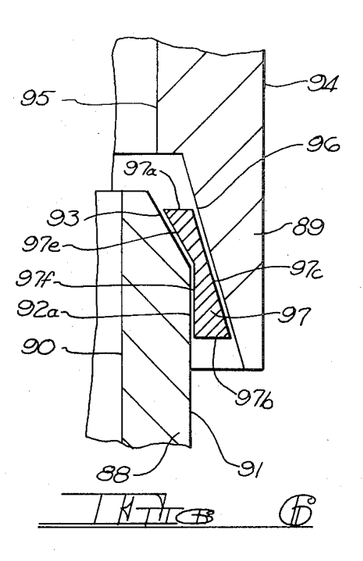
Figure 7:
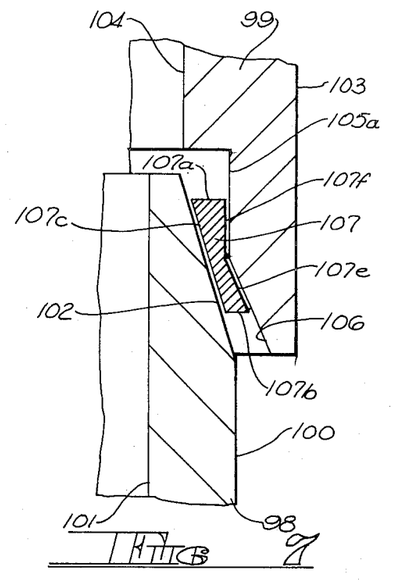
Figure 8:
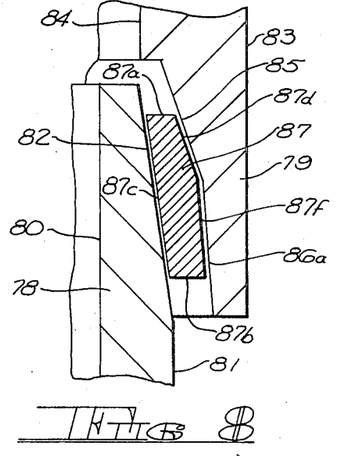

For example, it will be understood by one skilled in the art that the surface portion 92 of FIG. 4 could be cylindrical with an appropriate change in sealing ring surface 97d. This is shown at 92a and 97f in FIG. 6 wherein like parts have been given like index numerals. In FIG. 5 the surface 105 and sealing ring surface 107d could both be cylindrical. This is shown at 105a and 107f in FIG. 7 wherein like parts have been given like index numerals. Similarly the surfaces 86 and 87e of FIG. 3 could be frusto-conical, flaring outwardly in the same direction as and at a lesser angle than surfaces 85 and 82. This is shown at 86a and 87f in FIG. 8 wherein like parts have been given like index numerals.

Figure 9:
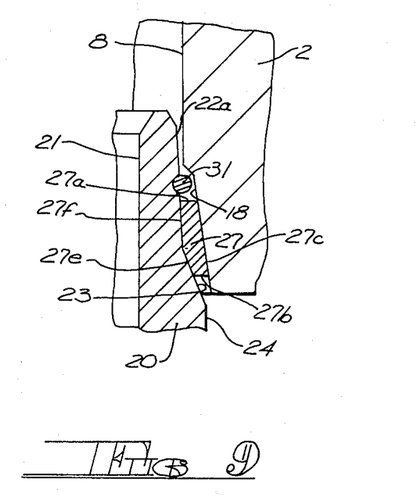

In the same fashion surface 22 and sealing ring surface 27d of FIG. 1 could be frusto-conical, flaring outwardly in the same direction as and at a lesser angle than surfaces 18 and 23. This is shown at 22a and 27f in FIG. 9 wherein like parts are given like index numerals. The same modifications could be made with respect to surface 25 and sealing ring surface 28d in FIG.

1 as well as surfaces 62 and 66 and sealing ring surfaces 86d and 69d of FIG. 2.

The embodiments of the invention in which an exclusive property or privilege is claimed are defined as follows:

1. A sealing ring for forming a seal between a pair of axially aligned conduits assembled with their end portions in concentric overlapped relationship so as to present juxtaposed annular sealing surfaces conforming to the inner and outer surfaces of said sealing ring respectively, said sealing ring comprising an annular member having inner and outer sealing surfaces, one of said inner and outer surfaces being smooth, continuous and frusto-conical, the other of said inner and outer surfaces having first and second surface portions, one of said first and second surface portions being smooth, continuous and frusto-conical, the other of said first and second surface portions also being smooth, continuous and frusto-conical, the juncture of said first and second portions defining the narrowest part of said seal.

2. The structure claimed in claim 1 wherein said outer sealing ring surface comprises said frusto-conical sealing surface, said inner sealing ring surface having said first and second surface portions.

3. The structure claimed in claim 1 wherein said inner sealing ring surface comprises said frusto-conical sealing surface, said outer sealing ring surface having said first and second surface portions.

4. A sealing ring for forming a seal between a pair of axially aligned conduits assembled with their end portions in concentric overlapped relationship so as to present juxtaposed annular sealing surfaces conforming to the inner and outer surfaces of said sealing ring respectively, said sealing ring comprising an annular member having inner and outer sealing surfaces, one of said inner and outer surfaces being smooth, continuous and frusto-conical, the other of said inner and outer surfaces having first and second surface portions, one of said first and second surface portions being smooth, continuous and frusto-conical, the other of said first and second surface portions being smooth, continuous and cylindrical, the juncture of said first and second portions defining the narrowest part of said seal.

5. The structure claimed in claim 4 wherein said outer sealing ring surface comprises said frusto-conical sealing surface, said inner sealing ring surface having said first and second surface portions.

6. The structure claimed in claim 4 wherein said inner sealing ring surface comprises said frusto-conical sealing surface, said outer sealing ring surface having said first and second surface portions.

* * * * *